US008953267B2

(12) United States Patent
Fischer (10) Patent No.: US 8,953,267 B2
(45) Date of Patent: Feb. 10, 2015

(54) DIGITAL INPUT DETECTOR AND ASSOCIATED ADAPTIVE POWER SUPPLY (75) Inventor: Jonathan H. Fischer, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 396 days.

(21) Appl. No.: 13/286,718

(22) Filed: Nov. 1, 2011

(65) Prior Publication Data
US 2013/0107392 A1 May 2, 2013

(51) Int. Cl.
G11B 5/09 (2006.01)

(52) U.S. Cl.
CPC .......................................... G11B 5/09 (2013.01)
USPC .................... 360/46; 360/39; 360/66; 360/67; 360/68; 360/75

(58) Field of Classification Search
None
See application file for complete search history.

(56) References Cited

U.S. PATENT DOCUMENTS

| 5,300,837 | A |   | 4/1994  | Fischer          |        |
|-----------|---|---|---------|------------------|--------|
| 5,381,062 | A |   | 1/1995  | Morris           |        |
| 5,465,054 | A |   | 11/1995 | Erhart           |        |
| 5,847,576 | A | * | 12/1998 | Mastrocola et al.| 326/31 |
| 5,896,044 | A | * | 4/1999  | Walden           | 326/80 |
| 6,023,429 | A | * | 2/2000  | Mecier et al.    | 365/194|
| 6,097,179 | A | * | 8/2000  | Ray et al.       | 323/312|
| 6,252,437 | B1| * | 6/2001  | Fischer et al.   | 327/89 |
| 6,441,670 | B1|   | 8/2002  | Coughlin, Jr. et al.|     |
| 7,164,305 | B2|   | 1/2007  | Gupta et al.     |        |
| 7,466,200 | B2| * | 12/2008 | Fischer          | 330/257|
| 7,495,483 | B2| * | 2/2009  | Kumar et al.     | 327/112|
| 7,872,825 | B2| * | 1/2011  | Sanghvi          | 360/67 |
| 8,687,302 | B2| * | 4/2014  | Hoque et al.     | 360/46 |
| 2007/0061090 | A1 |   | 3/2007  | Luo et al.      |        |
| 2007/0229144 | A1 | * | 10/2007 | Takahashi       | 327/518|
| 2009/0243567 | A1 | * | 10/2009 | Nakashimo       | 323/273|

FOREIGN PATENT DOCUMENTS

EP        12189060       3/2013
WO        2007103358 A2  9/2007

* cited by examiner

Primary Examiner — Dismery Mercedes
(74) Attorney, Agent, or Firm — Sheridan Ross P.C.

(57) ABSTRACT

Interface circuitry of a storage device or other type of processing device comprises a digital input detector and an adaptive power supply. The digital input detector comprises an input transistor. The adaptive power supply provides a variable supply voltage to the digital input detector that varies with a threshold voltage of the input transistor. In one embodiment, the variable supply voltage provided to the digital input detector by the adaptive power supply varies with the threshold voltage of the input transistor about a set point value determined as a function of an expected logic level of an input signal. For example, the set point value may be determined as a function of a minimum expected logic high input signal level. In such an arrangement, the input transistor is biased at or close to the threshold voltage for an input signal having the minimum expected logic high input signal level.

23 Claims, 5 Drawing Sheets

DIGITAL INPUT DETECTOR AND ASSOCIATED ADAPTIVE POWER SUPPLY

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

HDDs often include a system-on-chip (SOC) to process data from a computer or other processing device into a suitable form to be written to the storage disk, and to transform signal waveforms read back from the storage disk into data for delivery to the computer. The HDD includes a preamplifier that interfaces the SOC to the read/write head used to read data from and write data to the storage disk. The SOC communicates with the preamplifier through a digital interface in order to program preamplifier parameters such as signal gain and bandwidth, and to receive back information such as system faults detected by the preamplifier.

The SOC has extensive digital circuitry and has typically used advanced CMOS technologies to meet cost and performance objectives. This has driven the SOC to use power supply voltages different than those used by the preamplifier and has over time resulted in the digital interface between the SOC and preamplifier using a variety of different logic high input signal levels, such as 3.3V, 2.5V or 1.8V logic levels. The preamplifier is also used in factory servo writers that format the storage disk, and some of the servo writers use 5V logic levels to communicate with the preamplifier.

SUMMARY

Illustrative embodiments of the invention provide improved digital input detectors that are powered by one or more associated adaptive power supplies and are well suited for use in interface circuitry that may be part of a preamplifier in a disk-based storage device such as an HDD, or part of another type of processing device.

In one embodiment, an apparatus comprises a digital input detector and an adaptive power supply. The adaptive power supply provides a variable supply voltage to the digital input detector that varies with a threshold voltage of an input transistor of the digital input detector. The apparatus may be part of or may comprise interface circuitry of a storage device or other type of processing device.

The variable supply voltage provided to the digital input detector by the adaptive power supply may vary with the threshold voltage of the input transistor about a set point value that is determined as a function of an expected logic level of an input signal. For example, the set point value may be determined as a function of a minimum expected logic high input signal level. In such an arrangement, the input transistor is biased at or close to the threshold voltage for an input signal having the minimum expected logic high input signal level.

One or more of the illustrative embodiments provide significant improvements in disk-based storage devices or other processing devices that incorporate digital input detectors. For example, the variable supply voltage provided to the digital input detector by the adaptive power supply may be configured to track variations in the threshold voltage of the input transistor of the digital input detector. This helps to limit the amount of current drawn by the digital input detector when an input signal has a logic high level at or near the expected minimum and the threshold voltage changes with process and temperature.

DETAILED DESCRIPTION OF THE INVENTION

Embodiments of the invention will be illustrated herein in conjunction with exemplary disk-based storage devices, interface circuitry and associated digital input detection techniques. It should be understood, however, that these and other embodiments of the invention are more generally applicable to any processing device application in which improved digital input detection performance is desired.

Figure 1:
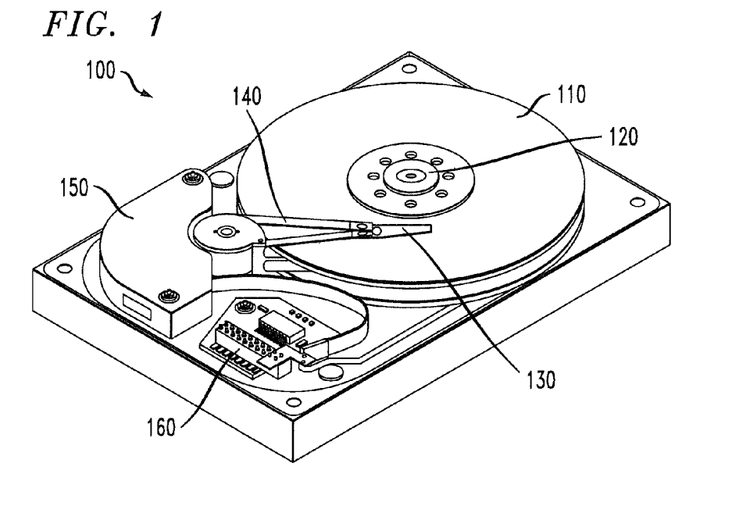
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials capable of storing data in the form of magnetization states. The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. The position of the read/write head over the storage surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. The term "control circuitry" as used herein is therefore intended to be broadly construed so as to encompass, by way of example and without limitation, drive electronics, signal processing electronics, and associated processing and memory circuitry, and may further encompass other elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only a single storage disk 110, read/write head 130, and positioning arm 140, this is by way of illustrative example only, and alternative embodiments of the invention may comprise multiple instances of these and other drive components. For example, one such alternative embodiment may comprise multiple storage disks attached to the same spindle so all such disks rotate at the same speed, and multiple read/write heads and associated positioning arms coupled to one or more actuators.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. The disclosed techniques are more generally applicable without limitation to any storage device or processing device application in which it is desirable to provide digital input detection capability. Those skilled in the art will therefore recognize that a wide variety of other storage device and processing device configurations may be used in implementing embodiments of the invention.

Figure 2:
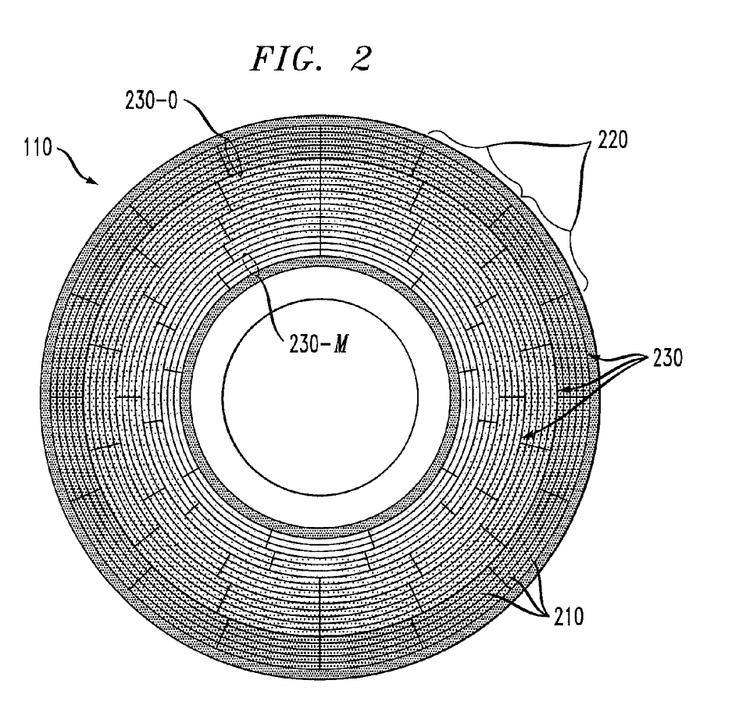
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Since each outer zone stores more data than the inner zones, the read/write head need not be moved as frequently to read a given amount of data when accessing data in the outer zones. Data can therefore be transferred at a higher rate to or from tracks in the outer zones than to or from tracks in the inner zones.

Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two.

As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The particular data transfer rates and other features referred to in the embodiment described above are presented for purposes of illustration only, and should not be construed as limiting in any way. A wide variety of other data transfer rates and storage disk configurations may be used in other embodiments.

An embodiment of the invention will be described below in conjunction with FIGS. 3 to 5, in which the storage device 100 of FIG. 1 is configured to implement interface circuitry comprising an improved digital input detector.

Figure 3:
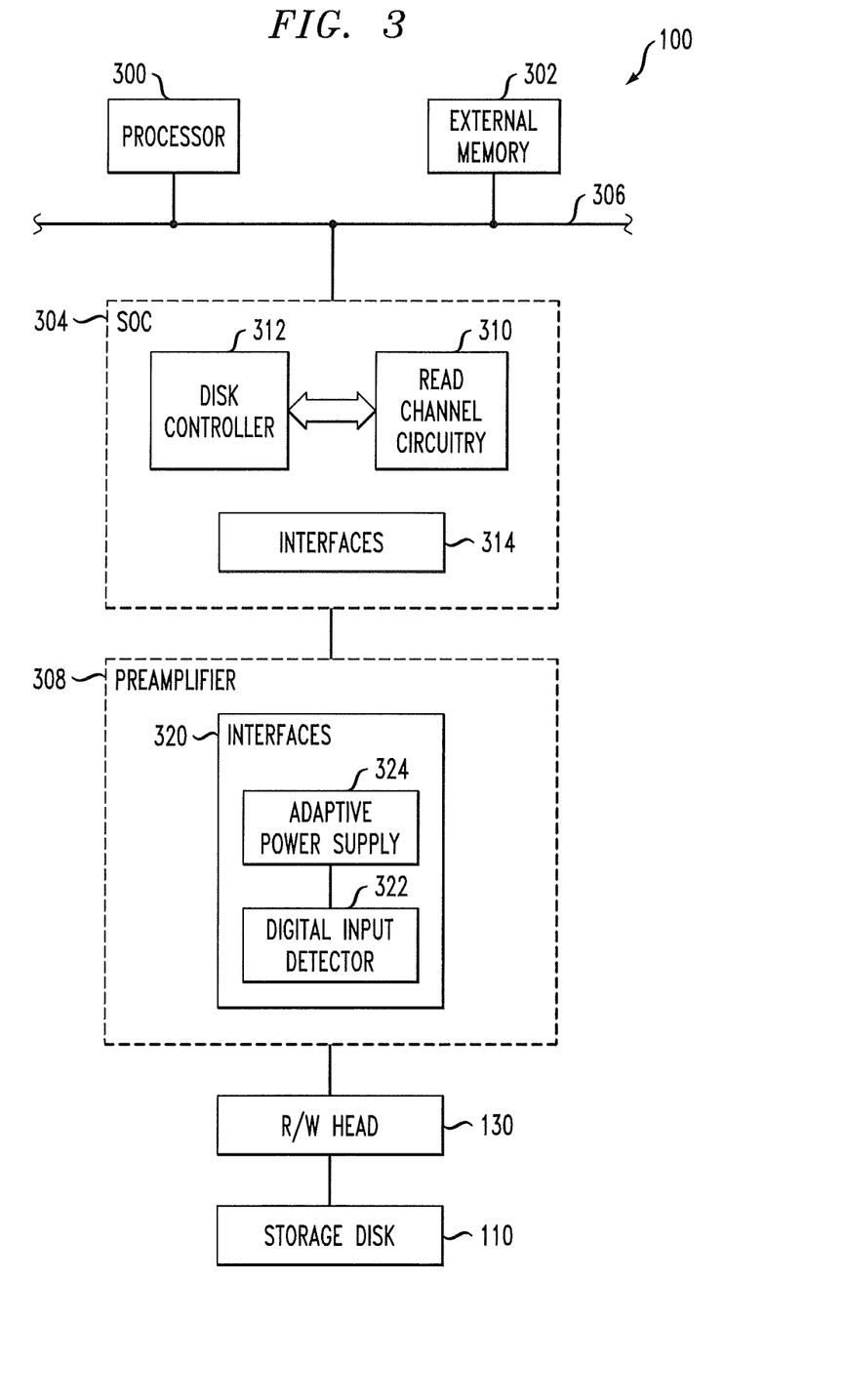
FIG. 3 is a block diagram of a portion of the storage device of FIG. 1 including an exemplary preamplifier comprising a digital input detector and an associated adaptive power supply.

FIG. 3 shows a portion of the storage device 100 of FIG. 1 in greater detail. In this view, the storage device 100 comprises a processor 300, a memory 302 and an SOC 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry."

The control circuitry of the storage device 100 as shown in FIG. 3 is therefore generally configured to process data received from and supplied to the read/write head 130 and to control positioning of the read/write head 130 relative to the storage disk 110.

In the present embodiment, certain operations of the SoC 304 may be directed by processor 300, which executes code stored in external memory 302. For example, the processor 300 may be configured to execute code stored in the memory 302 for performing read and write operations in the storage device 100. Thus, at least a portion of the control functionality of the storage device 100 may be implemented at least in part in the form of software code.

The external memory 302 may comprise electronic memory such as random access memory (RAM) or read-only memory (ROM), in any combination. For example, the external memory 302 may be implemented at least in part as a double data rate (DDR) synchronous dynamic RAM (SDRAM). The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement interface circuitry as disclosed herein. An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an integrated circuit implementation of an embodiment of the invention, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of this invention.

Although shown as part of the storage device 100 in the present embodiment, the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

The SOC 304 in the present embodiment includes interfaces 314 that communicate with interfaces 320 in the preamplifier 308. The interfaces 314 and 320 may be viewed as examples of what are more generally referred to herein as "interface circuitry." These interfaces may include, for example, an interface over which the SOC can program parameters of the preamplifier, such as signal gain and bandwidth, and possibly also receive back information such as system faults detected by the preamplifier. It is to be appreciated, however, that the disclosed techniques may be adapted for use with a wide variety of other types of interfaces.

As indicated previously, the SOC typically utilizes one or more power supply voltages that are different than those used by its associated preamplifier. For example, one of the interfaces 314 may provide digital input signals to the preamplifier that are based on an SOC power supply voltage of 3.3V, 2.5V or 1.8V. The digital input signals applied to the preamplifier 308 from the SOC 304 may therefore exhibit different logic high signal levels, depending upon the power supply voltage utilized in the SOC interface that generated those signals. In addition to handling these different logic high signal levels, the corresponding preamplifier interface may also be required to interface with a factory servo writer that is used to format servo marks on the storage disk 110, and such servo writers may provide digital input signals to the preamplifier that are have logic high signal levels based on a 5V power supply voltage.

The interfaces 320 of the preamplifier 308 in the present embodiment comprise at least one digital input detector 322 having an associated adaptive power supply 324. A detailed schematic of at least a portion of a given one of the preamplifier interfaces 320 is shown in FIG. 4. The digital input detector 322 comprises an input transistor, illustratively shown in the FIG. 4 embodiment as a P-type MOS (PMOS) transistor P1. The adaptive power supply 324 provides a variable supply voltage Vcomp to the digital input detector 322. The digital input detector 322 in this embodiment translates one or more of 1.8V, 2.5V, 3.3V and 5V input logic levels to 3.3V logic levels used inside the preamplifier 308.

The variable supply voltage Vcomp provided to the digital input detector 322 by the adaptive power supply 324 in the present embodiment varies with a threshold voltage of the input transistor P1 about a set point value determined as a function of an expected logic high input signal level received in the preamplifier 308 from the SOC 304. For example, the set point value may be determined as a function of a minimum expected logic high input signal level from the SOC 304 and the threshold voltage of the input transistor P1. As a more particular example, the set point value may be determined as a sum of the minimum expected logic high input signal level and the threshold voltage of the input transistor P1. An illustrative embodiment of the adaptive power supply 324 will be described below in conjunction with FIG. 5.

In other embodiments, other techniques may be used for determining a set point value for use by the adaptive power supply as a function of the expected logic high input signal level. For example, other techniques may be used to select the set point value such that the input transistor P1 is biased at or close to the threshold voltage for an input signal having the minimum expected logic high input signal level. Also, the set point value in other embodiments may be determined as a function of another expected logic level of an input signal, such as a minimum expected logic low input signal level, rather than the minimum expected logic high input signal level used in the embodiment of FIG. 4.

Figure 4:
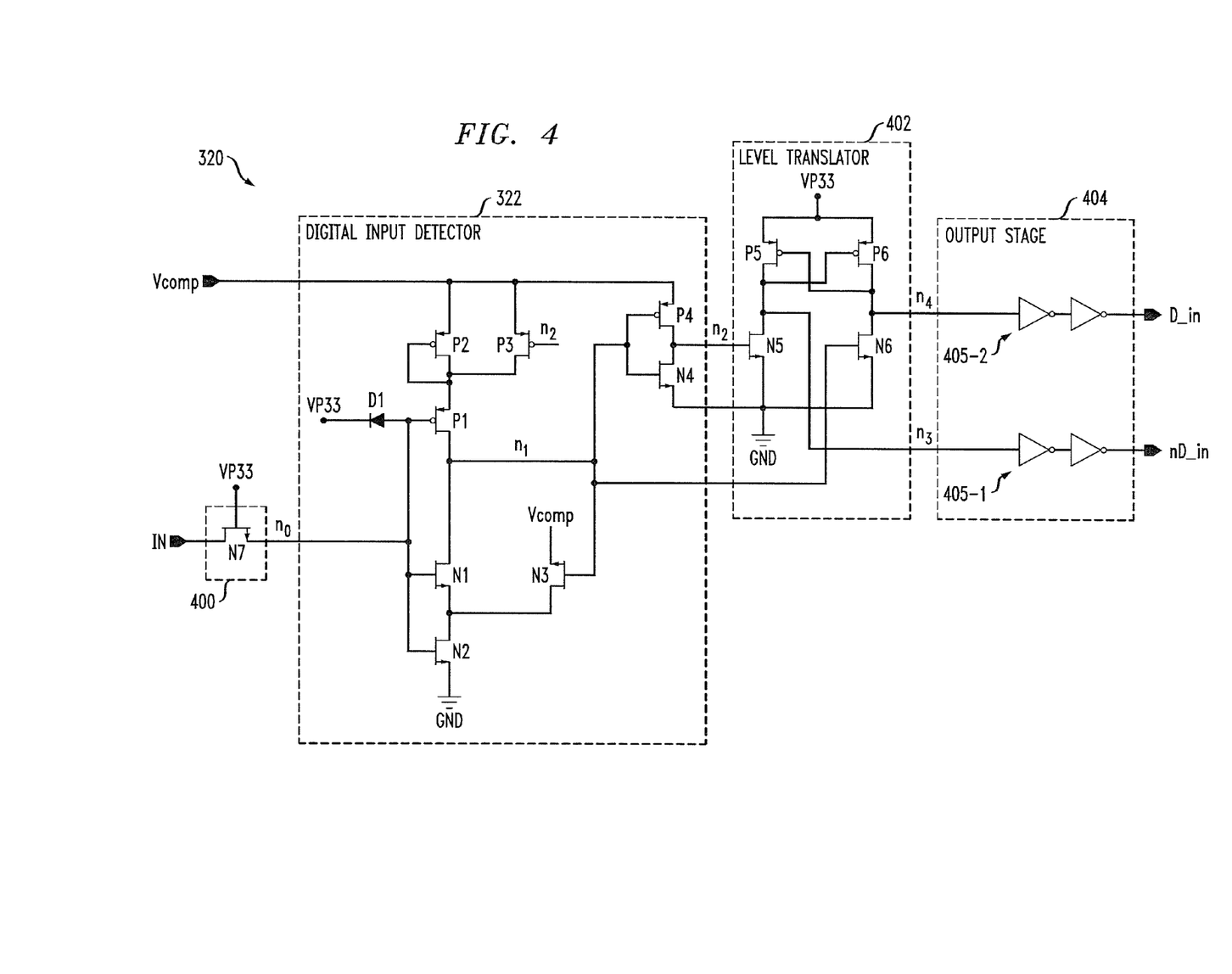
FIG. 4 is a schematic diagram showing the digital input detector and other interface circuitry of the preamplifier of FIG. 3.

With continued reference to FIG. 4, the interface circuitry 320 of the preamplifier 308 further comprises, in addition to the digital input detector 322, an input overstress protection device 400 coupled to an input node ($n_0$) of the digital input detector, level translator circuitry 402 having first and second inputs coupled to respective first and second output nodes ($n_1$ and $n_2$) of the digital input detector 322, and an output stage 404 comprising a first pair of series-connected inverters 405-1 coupled to a first output ($n_3$) of the level translator circuitry 402 and a second pair of series-connected inverters 405-2 coupled to a second output ($n_4$) of the level translator circuitry 402.

The input transistor P1 has its source coupled to the Vcomp output of the adaptive power supply via another PMOS transistor P2, and its drain coupled to a lower supply potential, illustratively ground potential, via N-type MOS (NMOS) transistors N1 and N2. The gate of input transistor P1 is coupled to the input node $n_0$ of the digital input detector 322. The drain of input transistor P1 is also coupled to the first output node $n_1$ of the digital input detector 322. In other embodiments, the lower supply potential may be implemented as a negative supply voltage, or other type of VSS supply voltage.

The gate of P1 is also coupled via a diode D1 to an upper supply potential, illustratively a 3.3V supply voltage in this embodiment, also denoted as VP33 in the figure. The diode D1 has its anode coupled to the gate of P1 and its cathode connected to the upper supply potential VP33. In other embodiments, alternative supply voltages may be used as the upper supply potential. The interface circuitry 320 as shown in FIG. 4 therefore utilizes two different power supplies, namely the adaptive supply Vcomp and the 3.3V supply VP33.

The NMOS transistors N1 and N2 have their respective gates coupled to the gate of the PMOS transistor P1 and therefore to the input node $n_0$ of the digital input detector 322. Also, the drain of N1 is coupled to the drain of P1, the drain of N2 is coupled to the source of N1, and the source of N2 is coupled to the lower supply potential.

The digital input detector 322 further comprises input level hysteresis circuitry that in this embodiment comprises at least PMOS transistors P2 and P3 having their respective drains coupled to the source of P1 and their respective sources coupled to the Vcomp output of the adaptive power supply. The gate of P2 is also coupled to its drain and to the source of P1, and the gate of P3 is coupled to the second output node $n_2$ of the digital input detector 322. The input level hysteresis circuitry in the present embodiment further includes NMOS transistor N3, which has its gate coupled to the drain of P1 and output node $n_1$. The drain of N3 is coupled to the drain of N2, and the source of N3 is coupled to the Vcomp output of the adaptive power supply 324.

The input level hysteresis circuitry comprising transistor P2, P3 and N3 in this embodiment is configured to allow relatively large input hysteresis levels without degrading signal propagation time. The hysteresis in this embodiment operates in the following manner. When an input signal at node $n_0$ is at a logic 0 level, P3 is on and connects the source of P1 to Vcomp. The input voltage will rise to be close to Vcomp plus the threshold voltage Vt of P1 before node $n_1$ can switch from logic 1 to logic 0. After the input is positive enough for node $n_1$ to switch state from logic 1 to logic 0, P3 is turned off and now the input voltage must be reduced to be less than the sum of Vcomp and the threshold voltages of P1 and P2 before node $n_1$ can start to change state from 0 to 1. The amount of hysteresis provided can therefore be increased by increasing the threshold voltage of P2.

The digital input detector 322 also includes an output inverter, with the inverter having its input coupled to the drain of P1 and first output node $n_1$ and its output coupled to the second output node $n_2$. The inverter comprises PMOS transistor P4 and NMOS transistor N4. The gates of P4 and N4 are both coupled to the first output node $n_1$, and thereby to the drain of input transistor P1. The source of P4 is coupled to the Vcomp output of the adaptive power supply 324. The drain of P4 and the drain of N4 are both coupled to the second output node $n_2$. The source of N4 is coupled to the lower supply potential, illustratively ground potential. The inverter comprising transistors P4 and N4 provides the logic inversion used to drive P3 so as to implement the desired hysteresis. The inverter also drives one input of the level translator circuitry 402.

The level translator circuitry 402 comprises PMOS transistors P5 and P6 and NMOS transistors N5 and N6. As indicated above, first and second inputs of the level translator circuitry are coupled to respective output nodes $n_1$ and $n_2$ of the digital input detector 322. More specifically, node $n_1$ is coupled to the gate of N6 and node $n_2$ is coupled to the gate of N5. The gates of P5 and P6 are cross-coupled to the drains of P6 and P5, respectively, and are also coupled to the drains of N6 and N5, respectively. The sources of both P5 and P6 are coupled to the upper supply potential, illustratively the 3.3V supply, and the sources of N5 and N6 are both coupled to ground potential. The outputs of the level translator circuitry 402 are provided at nodes $n_3$ and $n_4$. The level translator circuitry comprising transistors P5, P6, N5 and N6 is configured to translate Vcomp-to-ground signal swings on nodes $n_1$ and $n_2$ into to VP33-to-ground signal swings at nodes $n_3$ and $n_4$, for use by the pairs of series-connected inverters 405 of output stage 404 and other internal logic of the preamplifier 308.

The inverters 405 of output stage 404 are used to build up the output drive of the interface circuitry 320 to drive internal signal lines of the preamplifier 308. The output stage 404 provides uncomplemented and complemented outputs denoted D_in and nD_in, respectively, generated by detecting an input signal applied to input IN of the interface circuitry 320.

The input overstress protection device 400 coupled between interface circuitry input IN and the input node $n_0$ of the digital input detector 322 comprises a single NMOS transistor N7. The input overstress protection transistor N7 works with diode D1 to clamp the maximum positive voltage at input node $n_0$ to a safe gate-to-source voltage Vgs for transistors P1, N1 and N2 to avoid overstress when the interface circuitry is driven by 5V logic levels, such as those which might be supplied by a servo writer. If the input levels were restricted to 0 to 3.3V levels, the input overstress protection transistor N7 could be deleted in this embodiment.

Figure 5:
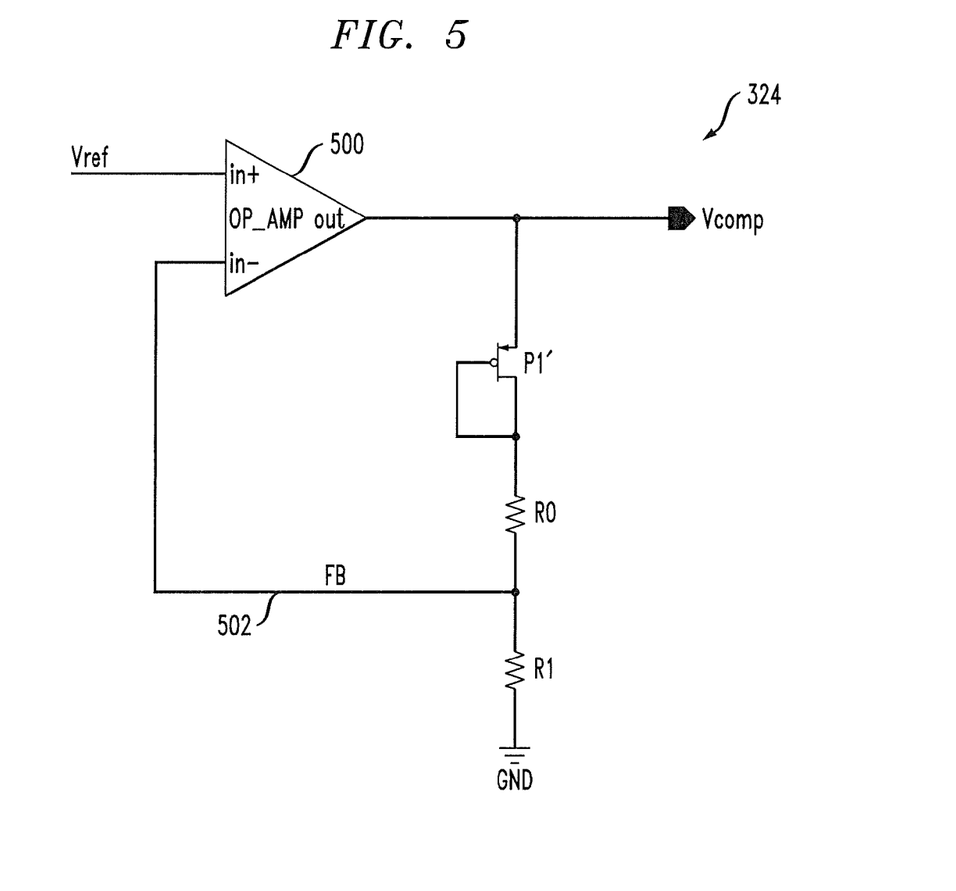
FIG. 5 is a schematic diagram of the adaptive power supply of the preamplifier of FIG. 3

Referring now to FIG. 5, one embodiment of the adaptive power supply 324 comprises an operational amplifier 500 having a non-inverting input (+), an inverting input (−) and an output providing the Vcomp supply voltage to the digital input detector 322. The non-inverting input is coupled to a reference voltage source Vref, the inverting input is coupled to a feedback (FB) path 502. The adaptive power supply 324 further comprises an adaptive power supply transistor P1' having one or more parameter variation characteristics over one or more environmental factors such as process and temperature that are substantially matched to those of the input transistor P1 of the digital input detector 322. The transistor P1' has a source coupled to the output of the operational amplifier 500, and its gate and drain are coupled together. In this embodiment, variations in the threshold voltage of P1 due to changes in process or temperature are tracked by corresponding variations in the threshold voltage of P1' and are thereby reflected in the adaptive supply voltage Vcomp.

The adaptive power supply 324 further comprises a pair of resistors R0 and R1 connected in series to form a voltage divider circuit between the drain of P1' and the lower supply potential, which as noted above is ground potential in this embodiment. Exemplary values for R0 and R1 in the present embodiment are 48 kΩ and 192 kΩ, respectively, although these values will of course vary depending upon the desired set point value for the adaptive power supply 324, which as noted above may be determined as a function of an expected logic high input signal level to be received from the SOC 304. The feedback path 502 back to the inverting input of the operational amplifier 500 is coupled to a tap of the voltage divider circuit between the first and second resistors R0 and R1.

In this embodiment, the adaptive supply voltage Vcomp provided by adaptive power supply 324 is set such that the input transistor P1 is biased near its threshold voltage when driven by the minimum expected logic high input signal level. This may be implemented by establishing a set point for Vcomp that is given by the sum of the minimum expected logic high input signal level and the threshold voltage of P1. In such embodiments, the set point may alternatively be expressed as a function of the minimum expected logic high input signal level and a gate-to-source voltage drop Vgs of P1.

The supply voltage Vcomp therefore varies to compensate for corresponding variations in PMOS threshold voltage with process and temperature, such that the input transistor P1 of the digital input detector 322 remains biased close to its threshold voltage when the input signal level is at the minimum expected logic high value. For example, the PMOS threshold voltage may decrease in magnitude with increasing junction temperature at a rate of approximately 2 mV°C. If this variation was not compensated for by the supply voltage Vcomp, the current flowing through the PMOS device P1 would increase with temperature when the input is driven by the minimum expected logic high level from the SOC, which could cause an unacceptably large supply current flowing through the digital input detector 322. The total variation over process and temperature could be as much as 0.2 to 0.5V in the present embodiment.

By way of example, assume in one embodiment that the minimum expected logic high input signal level is 1.52V, based on a known SOC supply voltage of 1.8V and expected ground potential differences between the SOC and the preamplifier. When the logic high input signal level is greater than 1.52V, P1 is pushed further into its off region with the supply current through P1 being reduced accordingly. The ratio of the resistor R0 and R1 of the voltage divider in this embodiment is set such that Vcomp is given by the minimum expected logic high level of 1.52V from the SOC, plus one PMOS Vgs, using a Vref value of 1.2V from a band gap reference source.

In this particular embodiment, the maximum current draw by the digital input detector 322 from the Vcomp supply when the logic high input signal level is at the expected minimum of 1.52V is only about 5 microamps.

This low maximum current draw is achieved while also reducing die area and total power dissipation from the input detector and its associated power supplies, relative to conventional interface circuitry arrangements.

Exemplary device sizes for the MOS transistor devices P1-P6, P1' and N1-N7 in the interface circuitry 320 of FIGS. 4 and 5 are given in the following table, although other device sizes may be used in other embodiments. The device sizes are given in terms of width and length in micrometers (μm).

| Interface Circuitry Device Sizes | | |
| --- | --- | --- |
| Device | W (μm) | L (μm) |
| P1 | 20.00 | 0.30 |
| P2 | 10.00 | 0.13 |
| P3 | 15.45 | 0.30 |
| P4 | 8.00 | 0.30 |
| P5 | 6.00 | 0.30 |
| P6 | 6.00 | 0.30 |
| P1' | 7.5 | 0.30 |
| N1 | 30.00 | 0.35 |
| N2 | 30.00 | 0.35 |
| N3 | 5.00 | 0.35 |
| N4 | 4.00 | 0.35 |
| N5 | 15.00 | 0.35 |
| N6 | 15.00 | 0.35 |
| N7 | 9.28 | 0.48 |

It is to be appreciated that the particular interface circuitry arrangements shown in FIGS. 4 and 5 are presented by way of example only, and other embodiments of the invention may utilize other types of circuitry to implement one or more digital input detectors and an associated adaptive power supply. It should be noted that multiple digital input detectors can be powered by the same adaptive power supply.

For example, in another embodiment of the invention, all of the PMOS devices in FIGS. 4 and 5 may be changed to NMOS devices and vice-versa. Such an embodiment has logic states that very between a negative supply potential and ground potential, rather than logic states that vary between ground potential and a positive supply potential as in the embodiment of FIGS. 4 and 5. In addition to changing the transistor types from P to N and vice-versa, one would also change the positive supply VP33 to a negative supply VN33, thereby providing a supply voltage 3.3V below ground potential, reverse the cathode and anode connections for diode D1, and change the sign of Vref from positive to negative. In such an arrangement, the set point value for the adaptive supply voltage Vcomp may be determined as a function of a minimum expected logic low input signal level and the threshold voltage of the input transistor, where the minimum expected logic low in this case denotes the least negative logic low. Numerous other configurations of circuitry may be used for implementing a digital input detector and its associated adaptive power supply in other embodiments.

As mentioned previously, the storage device configuration can be varied in other embodiments. For example, the storage device may comprise a hybrid HDD which includes a flash memory in addition to one or more storage disks. Also, interface circuitry as described herein is not limited to use in storage devices, and can be more generally implemented in other types of processing devices.

It is also to be appreciated that the particular storage disk configuration and recording mechanism can be varied in other embodiments of the invention. For example, recording techniques such as shingled magnetic recording (SMR) and bit-patterned media (BPM) can be used in one or more embodiments of the invention.

Figure 6:
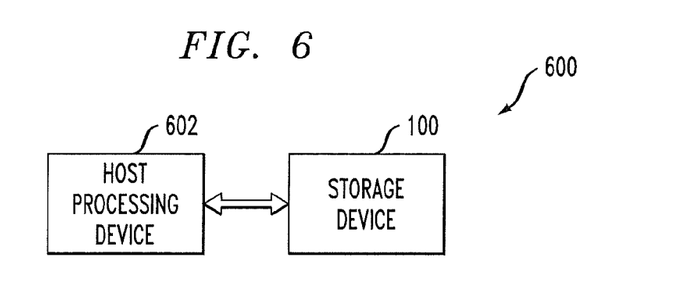
FIG. 6 illustrates interconnection of the storage device of FIG. 1 with a host processing device in a data processing system.

FIG. 6 illustrates a processing system 600 comprising the disk-based storage device 100 coupled to a host processing device 602, which may be a computer, server, communication device, etc. Although shown as a separate element in this figure, the storage device 100 may be incorporated into the host processing device. Instructions such as read commands and write commands directed to the storage device 100 may originate from the processing device 602, which may comprise processor and memory elements similar to those previously described in conjunction with FIG. 3.

Figure 7:
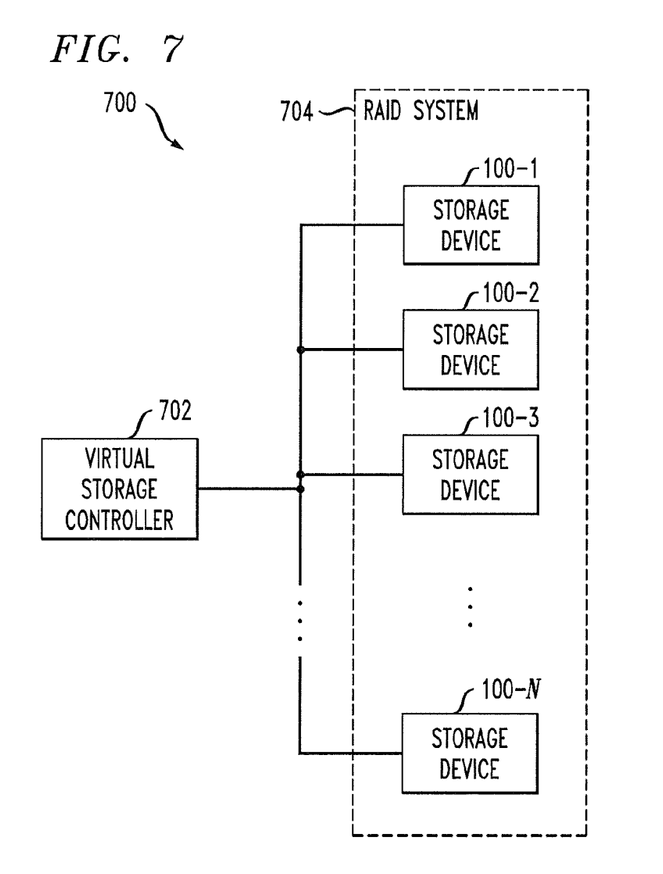
FIG. 7 shows a virtual storage system incorporating a plurality of disk-based storage devices of the type shown in FIG. 1.

Multiple disk-based storage devices 100 may be incorporated into a virtual storage system 700 as illustrated in FIG. 7. The virtual storage system 700, also referred to as a storage virtualization system, illustratively comprises a virtual storage controller 702 coupled to a RAID system 704, where RAID denotes Redundant Array of Independent Disks. The RAID system more specifically comprises N distinct storage devices denoted 100-1, 100-2, . . . 100-N, one or more of which are assumed to be configured to include interface circuitry comprising at least one digital input detector and an associated adaptive power supply as disclosed herein.

These and other virtual storage systems comprising HDDs or other disk-based storage devices of the type disclosed herein are considered embodiments of the invention. The host processing device 602 in FIG. 6 may also be an element of a virtual storage system, and may incorporate the virtual storage controller 702.

Again, it should be emphasized that the above-described embodiments of the invention are intended to be illustrative only. For example, other embodiments can use different types and arrangements of storage disks, read/write heads, control circuitry, interface circuitry and other storage device elements for implementing the described functionality. In addition, input detectors and associated adaptive power supplies as disclosed herein can be implemented in a variety of other types of processing devices. Furthermore, the particular manner in which a digital input detector and an associated adaptive power supply are configured, such as the manner in which a set point value is determined as a function of an expected logic level of an input signal, may be varied in other embodiments. These and numerous other alternative embodiments within the scope of the following claims will be apparent to those skilled in the art.

What is claimed is:

1. An apparatus comprising:
a digital input detector comprising an input transistor; and
an adaptive power supply having an output providing a variable supply voltage to the digital input detector;
wherein the variable supply voltage provided to the digital input detector by the adaptive power supply varies with a threshold voltage of the input transistor in order to keep a set point value determined as a function of an expected logic level of an input signal independent of a variation in the threshold voltage.

2. The apparatus of claim 1 wherein the set point value is selected such that the input transistor is biased at or close to the threshold voltage for an input signal having the expected logic level.

3. The apparatus of claim 1 wherein the input transistor comprises a first PMOS transistor having a source coupled to the output of the adaptive power supply, a drain coupled to a lower supply potential and a gate coupled to an input node of the digital input detector, wherein the drain of the first PMOS transistor is also coupled to a first output node of the digital input detector.

4. The apparatus of claim 3 wherein the digital input detector further comprises an inverter having an input coupled to the drain of the first PMOS transistor and an output coupled to a second output node of the digital input detector.

5. The apparatus of claim 4 wherein the inverter comprises a fourth PMOS transistor and a fourth NMOS transistor, with the fourth PMOS transistor having a gate coupled to the first output node, a source coupled to the output of the adaptive power supply and a drain coupled to the second output node, and the fourth NMOS transistor having a gate coupled to the first output node, a source coupled to the lower supply potential and a drain coupled to the second output node.

6. The apparatus of claim 3 wherein the digital input detector further comprises input level hysteresis circuitry comprising at least second and third PMOS transistors having respective drains coupled to the source of the first PMOS transistor and respective sources coupled to the output of the adaptive power supply, wherein a gate of the second PMOS transistor is also coupled to the source of the first PMOS transistor and a gate of the third PMOS transistor is coupled to the second output node of the digital input detector.

7. The apparatus of claim 6 wherein the input level hysteresis circuitry further comprises a third NMOS transistor having a gate coupled to the drain of the first PMOS transistor, a drain coupled to the drain of the second NMOS transistor, and a source coupled to the output of the adaptive power supply.

8. The apparatus of claim 3 wherein the digital input detector further comprises first and second NMOS transistors having respective gates coupled to the gate of the first PMOS transistor, with a drain of the first NMOS transistor coupled to the drain of the first PMOS transistor, a drain of the second NMOS transistor coupled to a source of the first NMOS transistor, and a source of the second NMOS transistor coupled to the lower supply potential.

9. The apparatus of claim 3 further comprising a diode having its anode coupled to the gate of the first PMOS transistor and its cathode connected to an upper supply potential.

10. The apparatus of claim 9 wherein the upper supply potential comprises a 3.3 volt supply potential and the lower supply potential comprises ground potential.

11. The apparatus of claim 1 further comprising an input overstress protection device coupled to an input node of the digital input detector.

12. The apparatus of claim 1 further comprising:
level translator circuitry having first and second inputs coupled to respective first and second output nodes of the digital input detector; and
an output stage comprising a first plurality of series-connected inverters coupled to a first output of the level translator circuitry and a second plurality of series-connected inverters coupled to a second output of the level translator circuitry.

13. An integrated circuit comprising the apparatus of claim 1.

14. The integrated circuit of claim 13 wherein said integrated circuit comprises a preamplifier integrated circuit.

15. The apparatus of claim 1 wherein the variable supply voltage provided to the digital input detector by the adaptive power supply supplies power to the digital input detector.

16. An apparatus comprising:
a digital input detector comprising an input transistor; and
an adaptive power supply having an output providing a variable supply voltage to the digital input detector;
wherein the variable supply voltage provided to the digital input detector by the adaptive power supply varies with a threshold voltage of the input transistor about a set point value determined as a function of an expected logic level of an input signal; and
wherein the set point value is determined as a function of a minimum expected logic high input signal level and the threshold voltage of the input transistor.

17. The apparatus of claim 16 wherein the set point value is determined as a sum of the minimum expected logic high input signal level and the threshold voltage of the input transistor.

18. An apparatus comprising:
a digital input detector comprising an input transistor; and
an adaptive power supply having an output providing a variable supply voltage to the digital input detector;
wherein the variable supply voltage provided to the digital input detector by the adaptive power supply varies with a threshold voltage of the input transistor; and
wherein the adaptive power supply comprises:
an operational amplifier having first and second inputs and an output, with the first input coupled to a reference voltage source, and the output providing the variable supply voltage to the digital input detector;
an adaptive power supply transistor having one or more parameter variation characteristics that are substantially matched to one or more corresponding parameter variation characteristics of the input transistor of the digital input detector, the adaptive power supply transistor having a source coupled to the output of the operational amplifier and having a gate and a drain that are coupled together; and
a voltage divider circuit comprising first and second resistive elements connected in series, with a first end of the series connection of the first and second resistive elements being coupled to the gate and drain of the adaptive power supply transistor, a second end of the series connection of the first and second resistive elements being coupled to a lower supply potential, and a tap between the first and second resistive elements being coupled to the second input of the operational amplifier via a feedback line.

19. The apparatus of claim 18 further comprising:

level translator circuitry having first and second inputs coupled to respective first and second output nodes of the digital input detector; and an output stage comprising a first plurality of series-connected inverters coupled to a first output of the level translator circuitry and a second plurality of series-connected inverters coupled to a second output of the level translator circuitry.

20. A method comprising the steps of:

providing a digital input detector comprising an input transistor; and providing a variable supply voltage to the digital input detector;

wherein the variable supply voltage provided to the digital input detector varies with a threshold voltage of the input transistor in order to keep a set point value determined as a function of an expected logic level of an input signal independent of a variation in the threshold voltage.

21. The method of claim 20 wherein the variable supply voltage provided to the digital input detector varies with the threshold voltage of the input transistor about the set point value.

22. A storage device comprising:

a read/write head configured to read data from and write data to a storage medium;

control circuitry configured to process data received from and supplied to the read/write head; and interface circuitry coupled between the read/write head and the control circuitry;

wherein the interface circuitry comprises:

a digital input detector comprising an input transistor; and an adaptive power supply having an output providing a variable supply voltage to the digital input detector; and wherein the variable supply voltage provided to the digital input detector by the adaptive power supply varies with a threshold voltage of the input transistor in order to keep a set point value determined as a function of an expected logic level of an input signal independent of a variation in the threshold voltage.

23. The storage device of claim 22 wherein the interface circuitry further comprises:

level translator circuitry having first and second inputs coupled to respective first and second output nodes of the digital input detector; and an output stage comprising a first plurality of series-connected inverters coupled to a first output of the level translator circuitry and a second plurality of series-connected inverters coupled to a second output of the level translator circuitry.

* * * * *